(12) United States Patent
Umemura et al.

(10) Patent No.: US 7,206,561 B2
(45) Date of Patent: Apr. 17, 2007

(54) RADIO EQUIPMENT

(75) Inventors: Masaya Umemura, Kawasaki (JP); Yukihide Inagaki, Kawasaki (JP); Isao Takita, Kawasaki (JP); Tsutomu Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 10/399,679

(22) PCT Filed: Oct. 19, 2001

(86) PCT No.: PCT/JP01/09210

§ 371 (c)(1),
(2), (4) Date: Oct. 14, 2003

(87) PCT Pub. No.: WO02/33837

PCT Pub. Date: Apr. 25, 2002

(65) Prior Publication Data

US 2005/0101360 A1   May 12, 2005

(30) Foreign Application Priority Data

Oct. 20, 2000   (JP)   ............................. 2000-327007

(51) Int. Cl.
*H04B 1/06*   (2006.01)
*H04M 1/00*   (2006.01)
*H05M 9/08*   (2006.01)

(52) U.S. Cl. ................ 455/276.1; 455/562.1; 455/575.7; 379/406.07

(58) Field of Classification Search ............. 455/550.1, 455/562.1, 575.7, 272, 276.1, 277.1; 370/286; 379/406.01, 406.04, 406.07, 406.16
See application file for complete search history.

(56) References Cited

U.S. PATENT DOCUMENTS

| | | | |
|---|---|---|---|
| 5,361,074 A * | 11/1994 | Hansen ..................... 342/381 |
| 6,035,183 A * | 3/2000 | Todd et al. ............... 455/226.2 |
| 6,415,141 B1 * | 7/2002 | Kakura et al. ........... 455/277.1 |
| 6,535,748 B1 * | 3/2003 | Vuorio et al. ............ 455/552.1 |
| 2002/0028674 A1 * | 3/2002 | Slettengren et al. ........ 455/422 |

FOREIGN PATENT DOCUMENTS

JP   10-336068   * 12/1998

* cited by examiner

*Primary Examiner*—Duc M. Nguyen
*Assistant Examiner*—Michael Thier
(74) *Attorney, Agent, or Firm*—Antonelli, Terry, Stout & Kraus, LLP.

(57) ABSTRACT

A radio equipment, wherein an attenuator (10) is inserted between antennas (91, 92) and a radio module (2), and output and input sensitivities are raised and lowered simultaneously so as to keep the balance of a radio covering range with an input receiver coverage at a constant, and the antenna (91) and the antenna (92) with attenuator are switched over by a switch (8) to increase and decrease the radio coverage range and input receiver coverage while keeping the balance of the dynamic radio coverage range with the input receiver coverage.

21 Claims, 15 Drawing Sheets

FIG.13
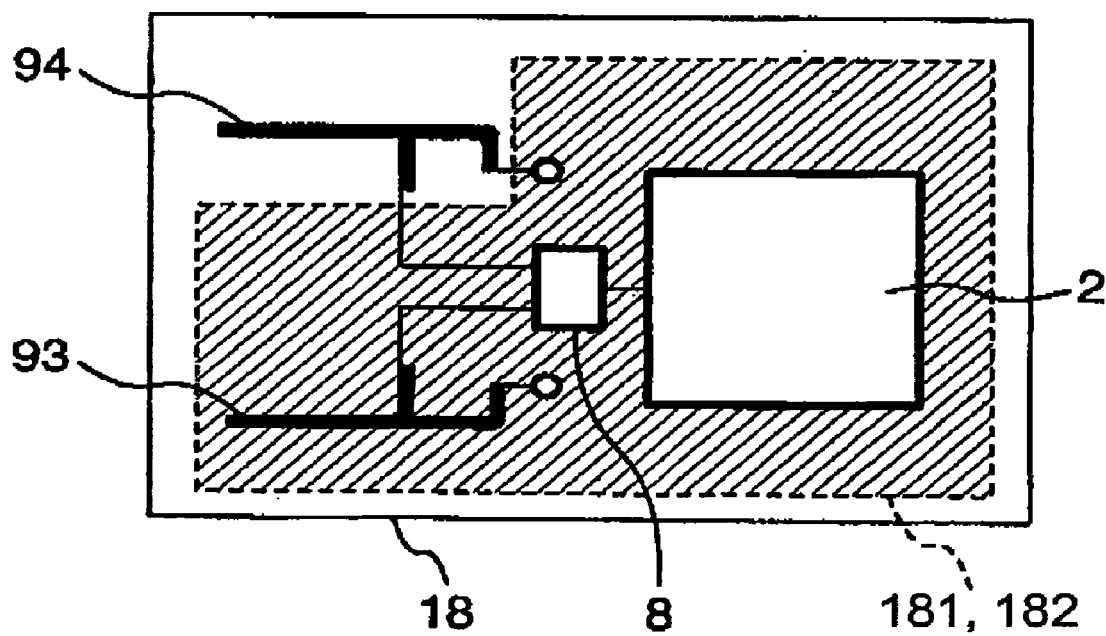
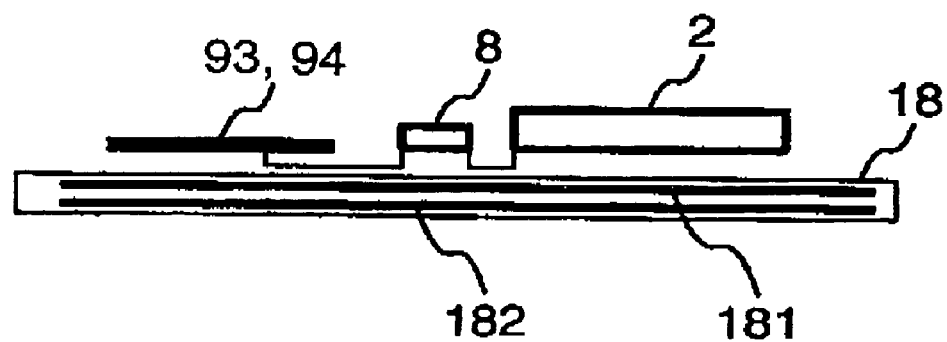

FIG.15
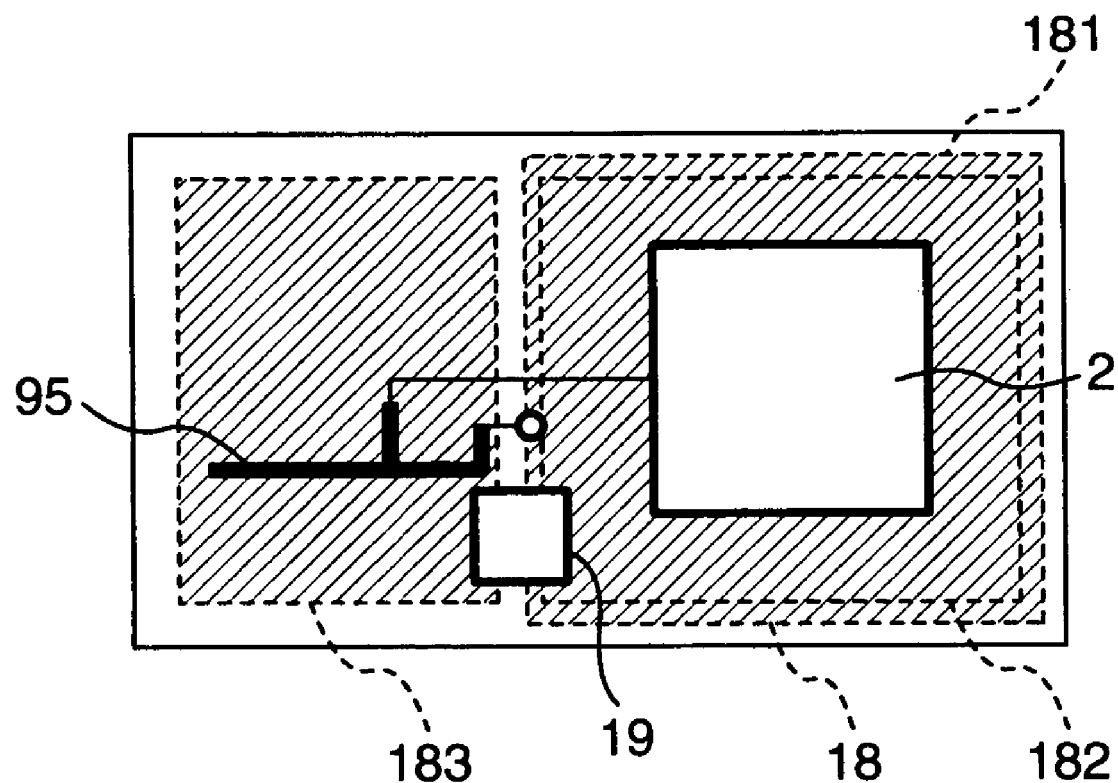
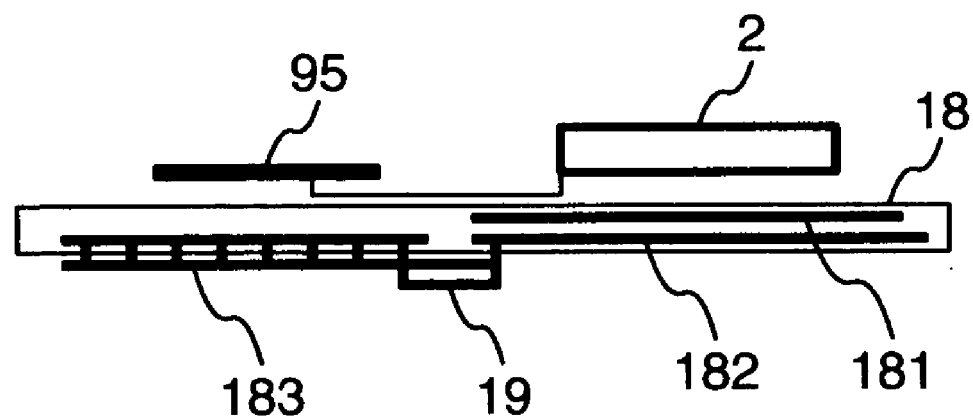

RADIO EQUIPMENT

TECHNICAL FIELD

The present invention relates to a radio equipment for performing radio communication, especially control and shaping of a communication range.

BACKGROUND ART

FIG. 12 is a diagram showing a conventional radio equipment. In the diagram, the reference numeral 1 designates a host controller; 2, a radio module; 3, a base band controller; 4, an endless interface; 5, a power amplifier; 6, a low-noise input amplifier; 7, a switch; and 9, an antenna as an inverted F antenna.

In the diagram, the host controller 1 transfers data to the base band controller 3. The base band controller 3 modulates the transferred data. The modulated electric signal is amplified by the output amplifier 5 and radiated as a radio wave from the antenna 9 to space through the switch 7. On the other hand, a radio wave propagated through the space is received in the antenna 9 and amplified by the low-noise input amplifier 6 through the switch 7. Then, the amplified electric signal is demodulated to data by the base band controller 3 and transferred to the host controller 1.

In the conventional radio equipment, because the output of the power amplifier 5 and the input sensitivity of the low-noise input amplifier 6 are fixed, the radio coverage range and the input receiver coverage in the radio equipment are also fixed. Accordingly, when, for example, a user of one radio equipment in which both coverage range and input receiver coverage are 10 m wants to communicate with another radio equipment having equal performance, the user (or the radio equipment itself) can judge whether the other radio equipment is in an area with a 10 m radius centering about the user or not.

The user of the radio equipment cannot judge whether any other radio equipment is near the user in the area with a 10 m radius. In other words, the user cannot specify who is the other radio equipment existing near the radio equipment of the user himself/herself. Furthermore, the user of the radio equipment cannot confirm whether the other radio equipment is coming near to or going far away from the user himself/herself.

On the other hand, there is a radio equipment in which the output of the power amplifier 5 is variable. In the radio equipment, however, the ratio of output to input sensitivity varies, so that the radio coverage range depending on the output is not equal to the input receiver coverage of the radio wave depending on the input sensitivity.

When, for example, the output of a radio equipment used as a base station at a certain point of time is raised, electric field intensity around the base station becomes so high that the coverage range is widened. Accordingly, a radio wave from the base station is audible to any radio equipment existing within the widened coverage range. When the base station calls any ambient radio equipment in this state, the ambient radio equipment tries to reply to the base station but linkage to the base station cannot be established because the output of the ambient radio equipment is low yet. Furthermore, there is a disadvantage that normal communication is disabled because the ambient radio equipment does nothing but repeat replying.

When the output of a radio equipment used as a mobile station at a certain point of time is lowered, electric field intensity around the mobile station is reduced so that the radio coverage range is narrowed. Accordingly, a radio wave cannot reach any radio equipments around the mobile station except radio equipments close to the mobile station. When a radio equipment not close to the mobile station calls in this state, the mobile station tries to reply to the calling radio equipment because the input receiver coverage of the mobile station is kept as it is. The output of the mobile station is however low, so that the radio wave cannot reach the calling radio equipment. Communication with calling the radio equipment is ceased and new linkage cannot be established. Furthermore, there is a disadvantage that normal communication is disabled because the mobile station does nothing but repeat replying.

In addition, in an environment in which a plurality of mobile stations generate a queue for a radio equipment which is a base station, for example, in a vending machine (base station) providing service on the basis of requests from radio equipments (mobile stations), the forefront of the queue, that is, the first radio equipment as a party to be serviced cannot be identified and priority cannot be distinguished between radio equipments registered as the queue.

DISCLOSURE OF THE INVENTION

An object of the invention is to change both input receiver coverage and coverage range of a radio equipment dynamically without change of the ratio between the two ranges to thereby specify a communication party and to particularly specify whether the other radio equipment is coming near to or going far away from the radio equipment.

To achieve the foregoing object, in accordance with the invention, in a radio equipment, a device for changing the intensity of input/output signals, specifically, an attenuator is inserted between an antenna and a radio module, and there is provided means for relationally raising and lowering output and input sensitivity by controlling the attenuator.

According to a preferred embodiment of the invention, the distance relation between radio equipments, especially a sequence of radio equipments registered in a queue and the radio equipment in the forefront of the queue are specified on the basis of difference between some radio equipment with which the radio equipment can communicate in an area with a 1 m radius and some radio equipment with which the radio equipment can communicate in an area with a 2 m radius when the radius as a set value of the attenuator is changed to 2 m and 1 m.

In another embodiment of the invention, in the radio equipment, an antenna and an antenna with attenuator are changed over by a switch so that the radio coverage range and the input receiver coverage can be increased and decreased while the balance of the radio coverage range and the input receiver coverage is kept good.

In a further embodiment of the invention, linkage of the radio equipment to any other radio equipment is established, for example, in an area with a 10 m radius and then the antennas are changed over so that communication is continued while the radio coverage range and the input receiver coverage in the radio equipment are enlarged and reduced alternately between the area with a 10 m radius and the area with a 1 m radius. As a result, the radio equipment judges whether the other radio equipment is coming near to or going far away from the area with a 1 m radius.

In a further embodiment of the invention, after linkage to some radio equipment which belongs to a plurality of other radio equipments and which is, for example, in an area with a 10 m radius is established, the other radio equipment reaching the area with a 1 m radius is specified in such a manner that communication is continued while the radio coverage range and the input receiver coverage in the radio equipment are enlarged and reduced alternately between the area with a 10 m radius and the area with a 1 m radius.

BRIEF DESCRIPTION OF THE DRAWINGS

FIG. 13 is a diagram showing a fourth modified example of the radio equipment to which the invention is applied;

FIG. 15 is a diagram showing a fifth modified example of the radio equipment to which the invention is applied.

BEST MODE FOR CARRYING OUT THE INVENTION

Figure 1:
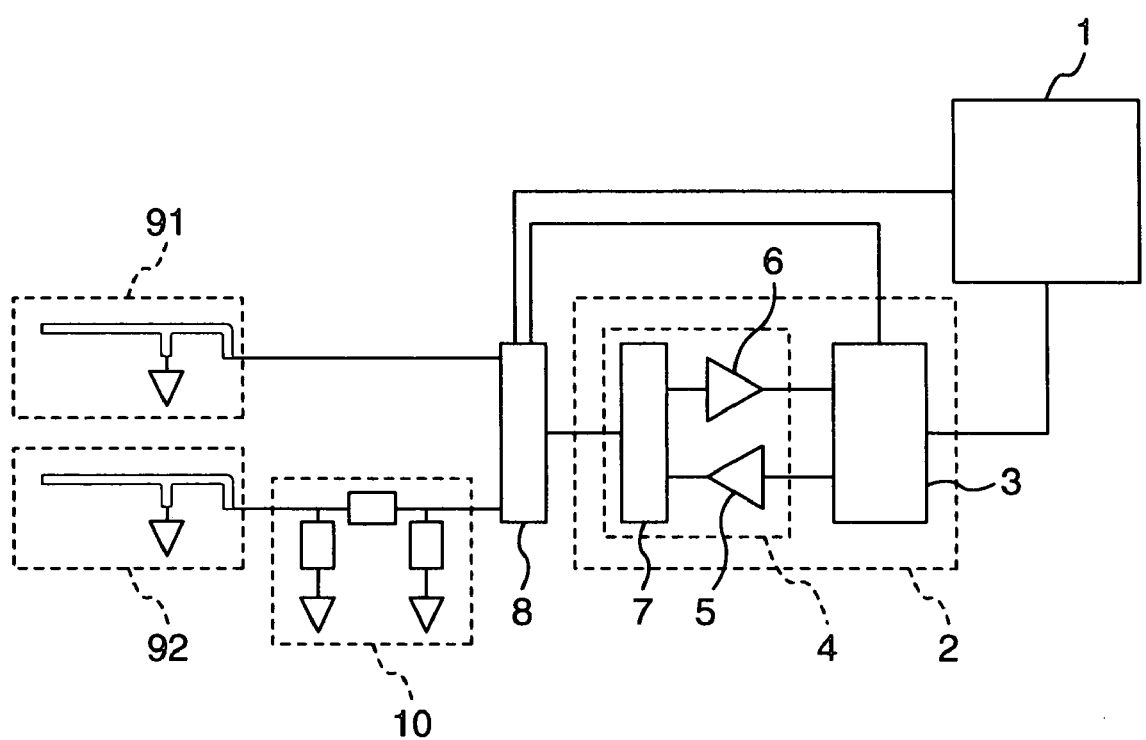
FIG. 1 is a diagram showing a radio equipment to which the invention is applied.

FIG. 1 is a diagram showing an embodiment of a radio equipment to which the invention is applied.

In FIG. 1, the reference numeral 1 designates a host controller; 2, a radio module; 3, a base band controller; 4, an radio interface; 5, a power amplifier; 6, a low-noise input amplifier; 7 and 8, switches; 91 and 92, inverted F antennas; and 10, an attenuator.

The host controller 1 transfers data to the base band controller 3. The transferred data is modulated by the base band controller 3 and amplified by the output amplifier 5, so that the data reaches the switch 8 in the outside of the radio module 2 through the switch 7. The antenna 91 is connected to the switch 8 whereas the antenna 92 is connected to the switch 8 through the attenuator 10. When the data reaching the switch 8 is to be output through antenna, the base band controller 3 controls the switch 8 to select either of the antennas 91 and 92. A radio wave is radiated to space from the antenna selected by the switch 8.

Incidentally, the antennas 91 and 92 may be replaced by only one antenna 92 and configuration may be made so that the switch 8 can select whether the attenuator 10 is to be driven or not. In this configuration, the same effect as that of the invention can be generated in spite of reduction in the number of antennas.

On the other hand, a radio wave propagated through space is received in each of the antennas 91 and 92. The received radio waves (data) are input from the antenna 91 to the switch 8 and from the antenna 92 to the switch 8 through the attenuator 10, respectively. The base band controller 3 controls the switch 8 to select either of the data input to the switch 8. The selected data is input to the radio module 2. The data input to the radio module 2 is amplified by the low-noise input amplifier 6 and demodulated by the base band controller 3. The demodulated data is transferred to the host controller 1.

Figure 2:
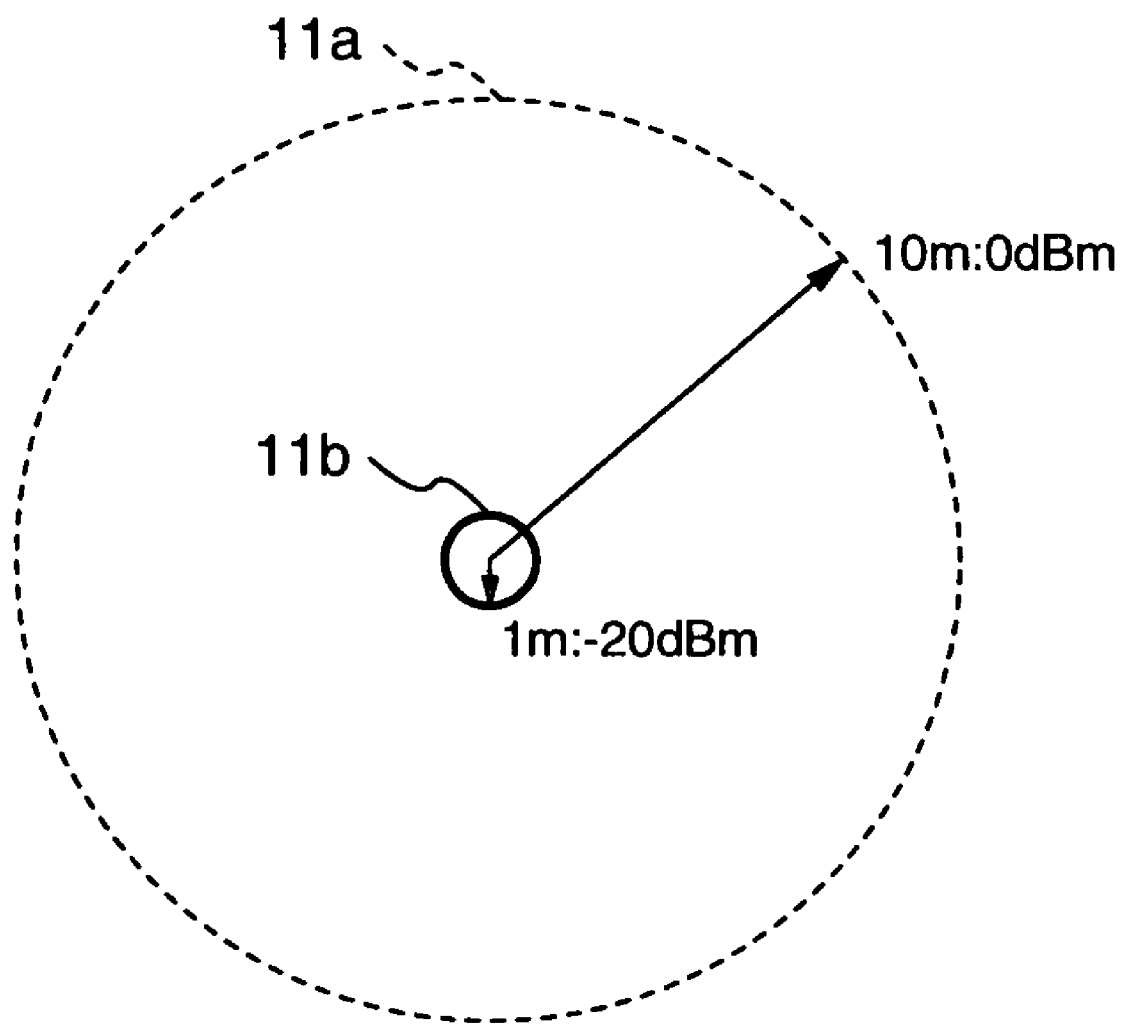
FIG. 2 is a diagram showing a radio coverage range in the radio equipment to which the invention is applied.

FIG. 2 is a diagram showing a radio coverage range in the radio equipment in FIG. 1. The reference numeral 11a designates a radio coverage range at an output of 0 dBm; and 11b, a radio coverage range at an output of −20 dBm. In this embodiment, respective outputs of the antennas are set so that electric field intensity at a position in the coverage range 11a in the case of output through the antenna 91 becomes equal to that at a position in the coverage range 11b in the case of output through the antenna 92.

Figure 3:
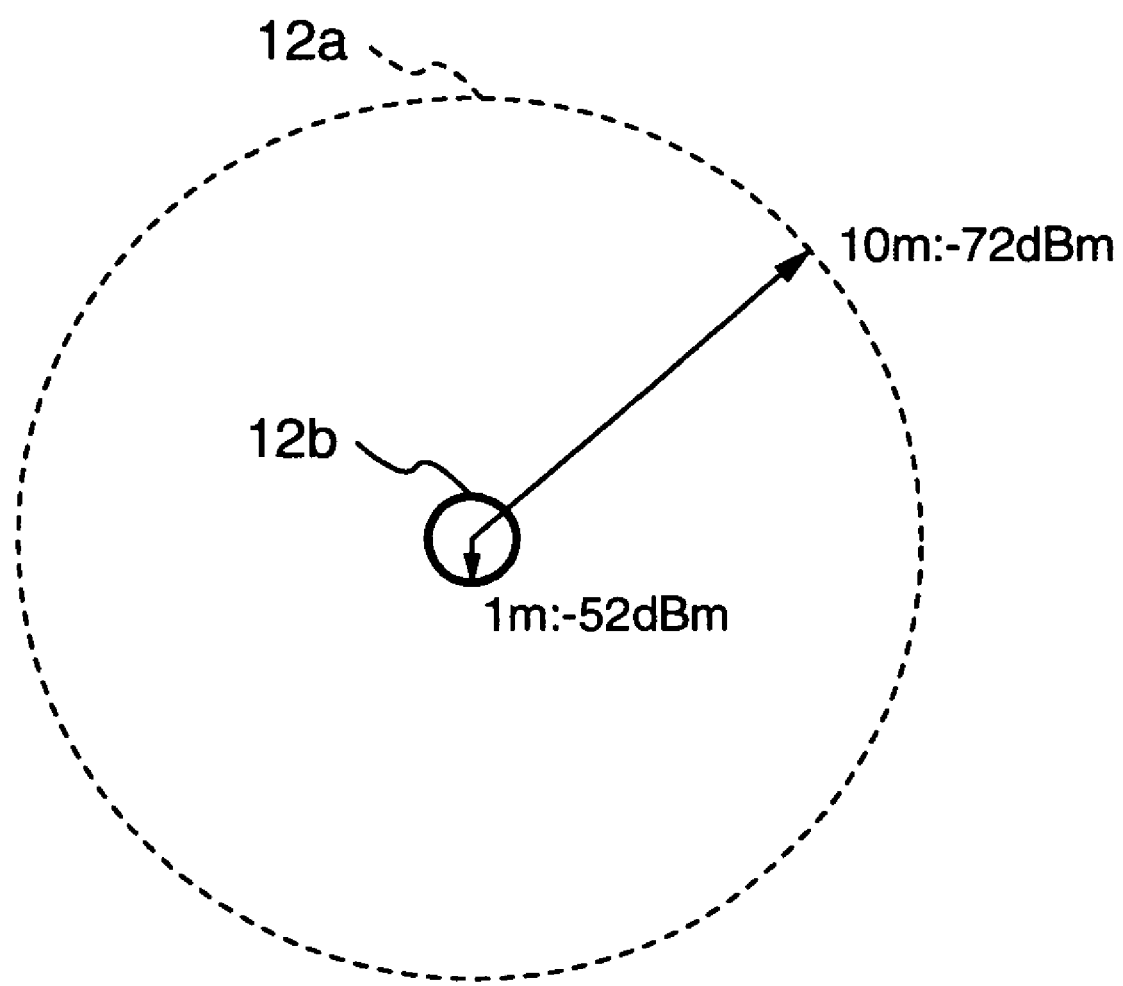
FIG. 3 is a diagram showing an input receiver coverage of the radio wave in the radio equipment according to the invention.

FIG. 3 is a diagram showing an input receiver coverage of the radio wave in the radio equipment in FIG. 1. The reference numeral 12a designates an input receiver coverage at an input sensitivity of −72 dBm; and 12b, an input receiver coverage at an input sensitivity of −52 dBm. In this embodiment, the switch 8 is changed over so that a radio wave output from a sender in the input receiver coverage 11a can be received when the data received in the antenna 91 is used whereas a radio wave output from the sender of the same output in the input receiver coverage 11b can be received when the data received in the antenna 92 is used.

Figure 4:
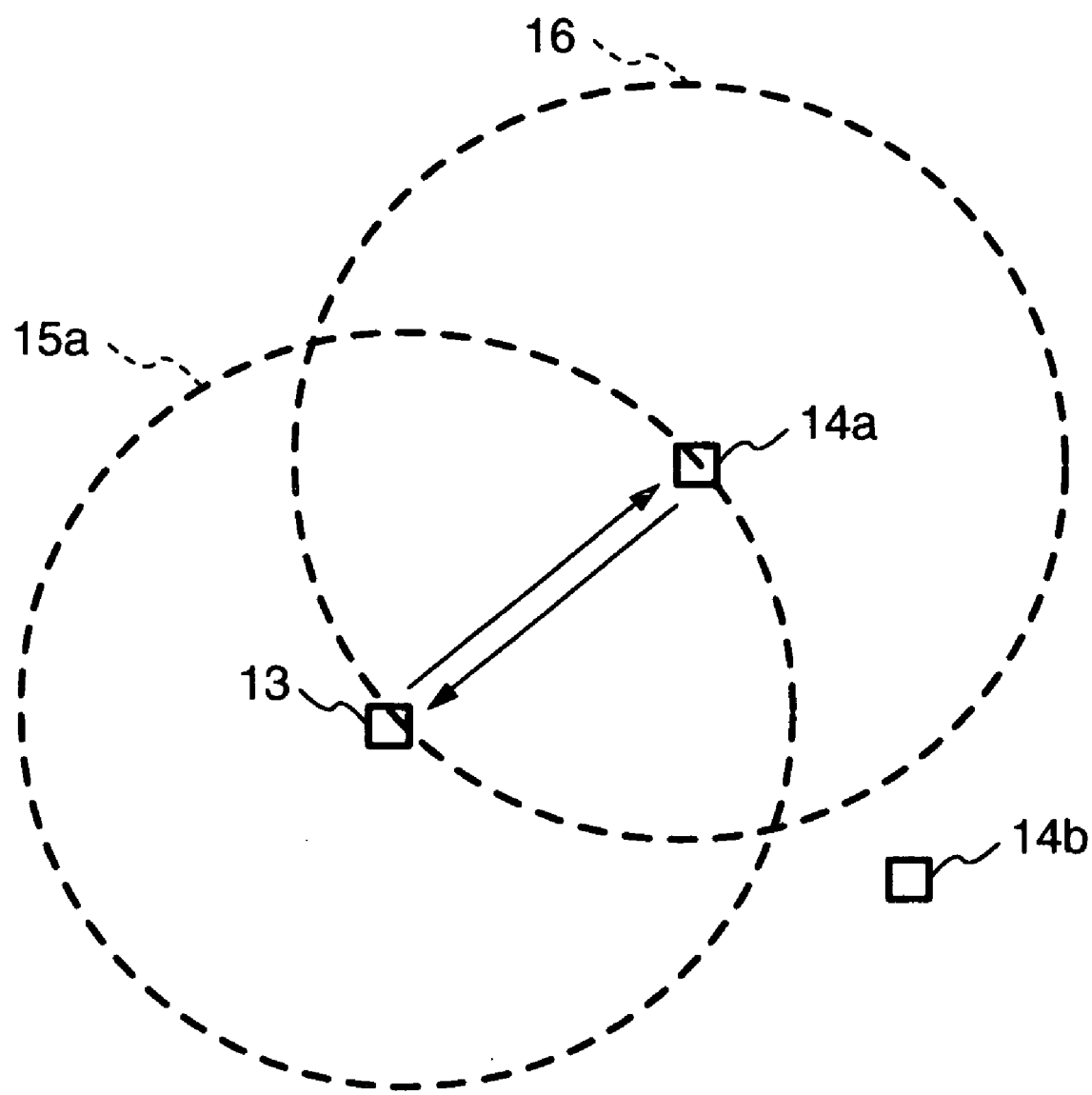
FIG. 4 is a diagram showing establishment of linkage of the radio equipment according to the invention.

FIG. 4 is a diagram showing establishment of linkage of the radio equipment to which the invention is applied. In the diagram, the reference numeral 13 designates a radio equipment to which the invention is applied; 14a and 14b, conventional radio equipments; 15a, a radio coverage range and an input receiver coverage in the radio equipment 13; and 16, a radio coverage range and an input receiver coverage in the radio equipment 14a.

The radio equipment 13 transmits and receives a radio wave at 10 dBm output and −72 dBm input sensitivity without interposition of the attenuator 10 by changing over the switch 8. On this occasion, the radio coverage range and the input receiver coverage in the radio equipment 13, that is, the radius of 15a is 10 m.

The radio equipment 14a transmits and receives a radio wave at 10 dBm output and −72 dBm input sensitivity. The radio coverage range and the input receiver coverage in the radio equipment 14a, that is, the radius of 16 is 10 m which is equal to that in the radio equipment 13.

In FIG. 4, the radio equipment 13 is within the radio coverage range 16 of the radio equipment 14a whereas the radio equipment 14a is within the radio coverage range 15a of the radio equipment 13. That is, electric field intensity at the position of each radio equipment is at the level allowing the output of the other radio equipment to be received. Accordingly, each radio equipment is at the distance allowing the other radio equipment to be called, so that linkage can be established.

Figure 5:
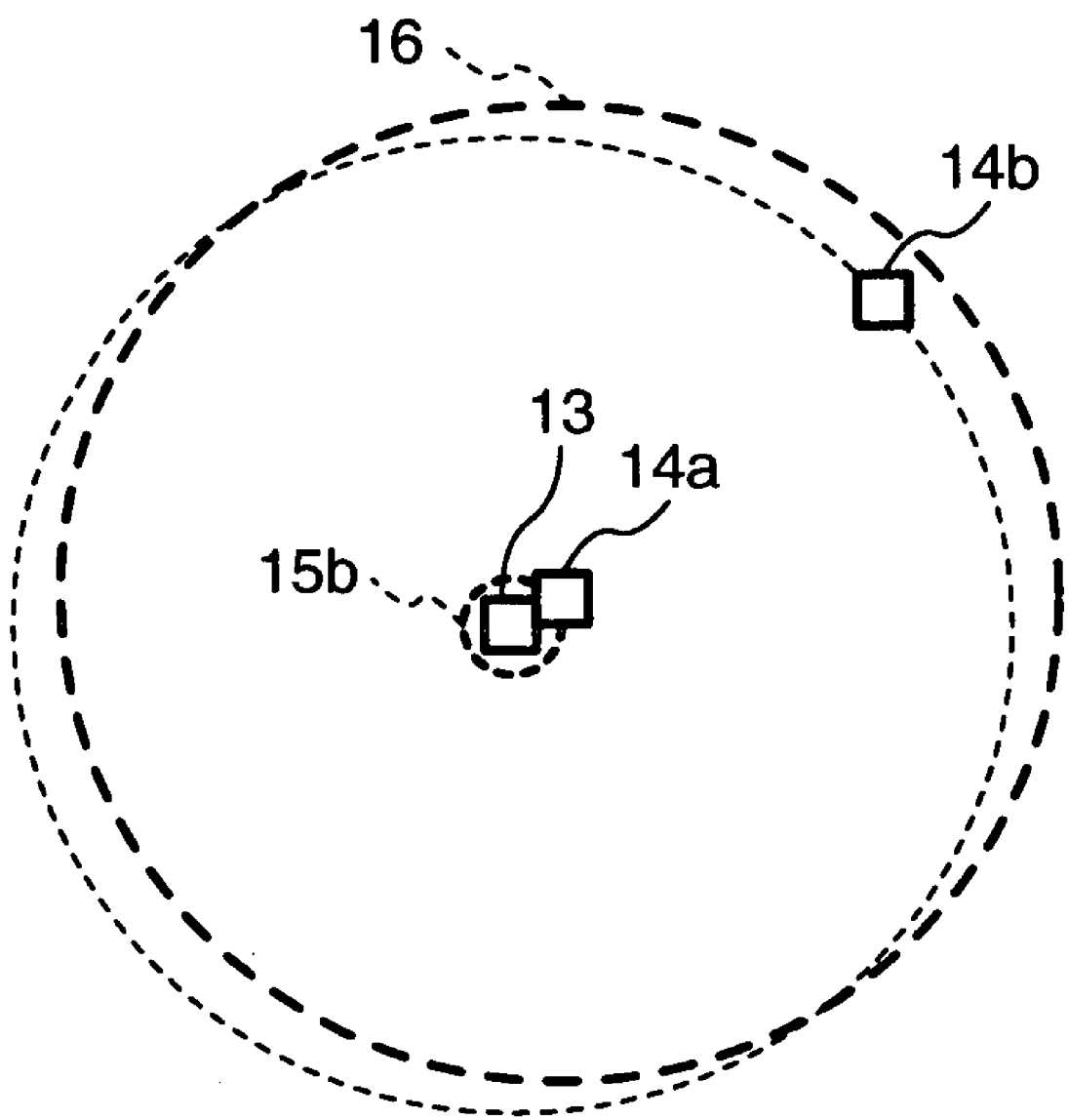
FIG. 5 is a diagram showing changing over the radio coverage range and the input receiver coverage in the radio equipment according to the invention.

FIG. 5 is a diagram showing the case where the radio coverage range and the input receiver coverage of the radio equipment 13 in FIG. 4 is changed over. In the diagram, the reference numeral 15b designates a radio coverage range and an input receiver coverage in the radio equipment 13 in the case where a radio wave is transmitted and received in the antenna 92 through the attenuator 10. In this case, the radius of 15b is 1 m.

FIG. 5 also shows a state in which the radio equipment 14a having established linkage to the radio equipment 13 in FIG. 4 is coming near to the radio equipment 13. In this case, the radio equipment 14a can only receive the radio wave output from the radio equipment 13 when the radio equipment 14a enters the circle of the radio coverage range and the input receiver coverage of the radio equipment 13 represented by 15b.

Although the output of the radio equipment 14a is always high, the output sensitivity of the radio equipment 13 is lowered by −20 dBm by the attenuator 10. That is, the input receiver coverage is narrowed to 15b. Accordingly, the radio equipment 13 can only receive the radio wave output from the radio equipment 14a when the radio equipment 14a enters the circle of 15b. That is, when the radio coverage range and the input receiver coverage of the radio equipment 13 are reduced while the ratio between the two ranges is kept constant, the radio equipment 13 can communicate with only the radio equipment 14a which is coming near to the radio equipment 13.

Assume further that the radio equipment 14b is in the rear of the radio equipment 14a sequentially. In this case, the radio equipment 13 detects the presence of the radio equipment 14a and the radio equipment 14b by using the radio coverage range and the input receiver coverage 15a. When the radio equipment 13 changes over the antennas to select 15b as the radio coverage range and the input receiver coverage after the presence of these radio equipments is detected, the radio equipment with which the radio equipment 13 can communicate is only 14a which is coming near to the radio equipment 13. In this case, the radio equipment 13 can specify an array of radio equipments in the sequence of the radio equipment 14a and the radio equipment 14b viewed from the radio equipment 13 by confirming the difference between radio equipments with which the radio equipment 13 can communicate, that is, by confirming the presence/absence of radio equipments before and after change in the radio coverage range and the input receiver coverage. In addition, it can be specified that the radio equipment 14a is a radio equipment near the radio equipment 13.

As described above in FIGS. 4 and 5, because the radio equipment 13 has means for changing over the radio coverage range and the input receiver coverage, the radio equipment 13 can specify whether the radio equipment 14a having linkage established in the radio coverage range and the input receiver coverage 15b is coming near to or going far away from the radio equipment 13 after the linkage is established.

When there are a plurality of radio equipments, the radio equipment 13 can specify the respective positions of the plurality of radio equipments. In this case, the radio equipments the positions of which can be specified may be conventional radio equipments each having a radio coverage range and an input receiver coverage of a predetermined value or about 10 m.

Figure 6:
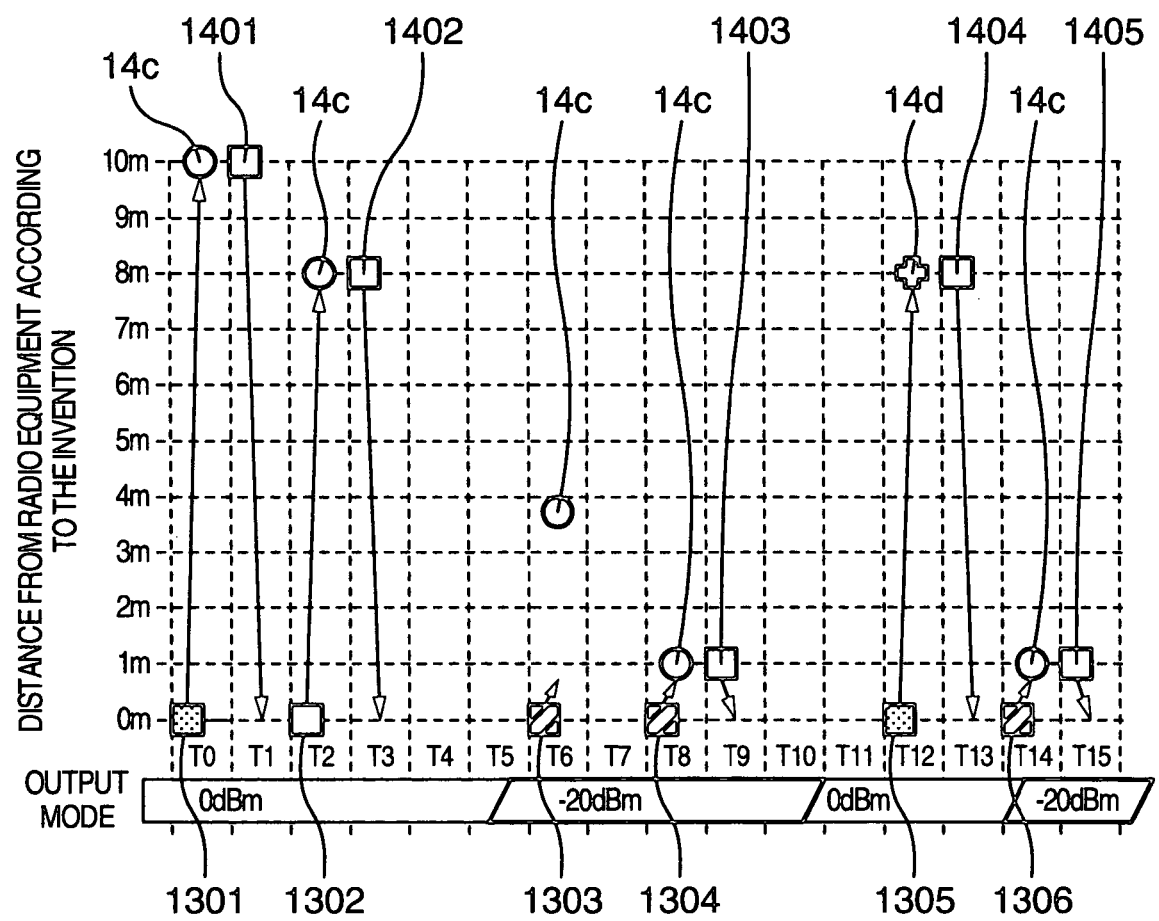
FIG. 6 is a diagram showing changing over the radio coverage range and the input receiver coverage and the outline of communication due to a timer.

FIG. 6 is a diagram showing communication timing in the case where the radio equipment (radio equipment 13) according to the invention changes over the radio coverage range and the input receiver coverage by a timer. In the diagram, the reference numerals 1301, 1302, 1303, 1304, 1305 and 1306 designate calls from the radio equipment 13; 14c and 14d, conventional radio equipments; and 1401, 1402, 1403, 1404 and 1405, replies from the radio equipments 14c and 14d. In FIG. 6, the vertical axis of the graph shows relative distances from the radio equipment 13 to the radio equipments 14c and 14d.

The radio equipment 13 outputs a call 1301 with power of 0 dBm at time T0. Upon reception of the call 1301, the radio equipment 14c gives a reply 1401 at time T1. Continuously, the radio equipment 13 outputs a call 1302 at time T2. Upon reception of the call 1302, the radio equipment 14c gives a reply 1402 at time T3.

Upon reception of the reply 1402, the radio equipment 13 changes over the output of the equipment to −20 dBm at the right time on the basis of the passage of a predetermined time according to the built-in timer. In FIG. 6, the radio equipment 13 changes over the output so that changing-over of the output will be completed at time T5. The radio equipment 13 outputs a call 1303 at time T6. In the diagram, there is however no reply from the radio equipment 14c to the radio equipment 13 because the radio equipment 14c is out of the radio coverage range of the radio equipment 13. When there is no reply, the radio equipment 13 makes a decision at time T7 that the radio equipment 14c is not approaching or is absent in the area with a 1 m radius centering about the radio equipment 13.

Continuously, the radio equipment 13 outputs a call 1304 again at time T8. At the time T8, the radio equipment 14c in the area with a 1 m radius centering about the radio equipment 13 can receive the call 1304. Upon reception of the call 1403, the radio equipment 14c gives a reply 1403 at time T9.

Upon reception of the reply 1403, the radio equipment 13 recognizes the presence of the radio equipment 14c in the area with a 1 m radius centering about the radio equipment 13 and prepares for service provision. The radio equipment 13 returns the output to 0 dBm while preparing for service.

The radio equipment 13 outputs a call 1305 with power of 0 dBm at time T12. Upon reception of the call 1305, the radio equipment 14d gives a reply 1404 at time T13. When the preparation for service is completed in the meantime, the radio equipment 13 changes over its own output to −20 dBm at time T14 and outputs a call 1306. The call 1306 is received in the radio equipment 14c waiting for the start of service provision in a neighbor of the radio equipment 13. Upon reception of the call 1306, the radio equipment 14c gives a reply 1405 at time T15. By such exchange, service is provided to 14c.

The radio equipment 13 having succeeded in calling the radio equipment 14d at the output of 0 dBm changes over its own output to −20 dBm after the passage of a predetermined time according to the timer in the same manner as described above and detects approach of the called radio equipment 14d. The radio equipment 13 having succeeded in detecting the approach begins to prepare for provision of service in the same manner as in the case of the radio equipment 14c. At the same time, the radio equipment 13 changes over its output to 0 dBm and calls another radio equipment until preparation for provision of service is completed. When preparation for provision of service is completed, the radio equipment 13 changes over its output to −20 dBm again. The radio equipment 13 then calls the radio equipment 14d kept waiting near the radio equipment 13 and begins to provide service. In this manner, the timer is used for efficiently detecting approach of the radio equipment and proving service.

Figure 7:
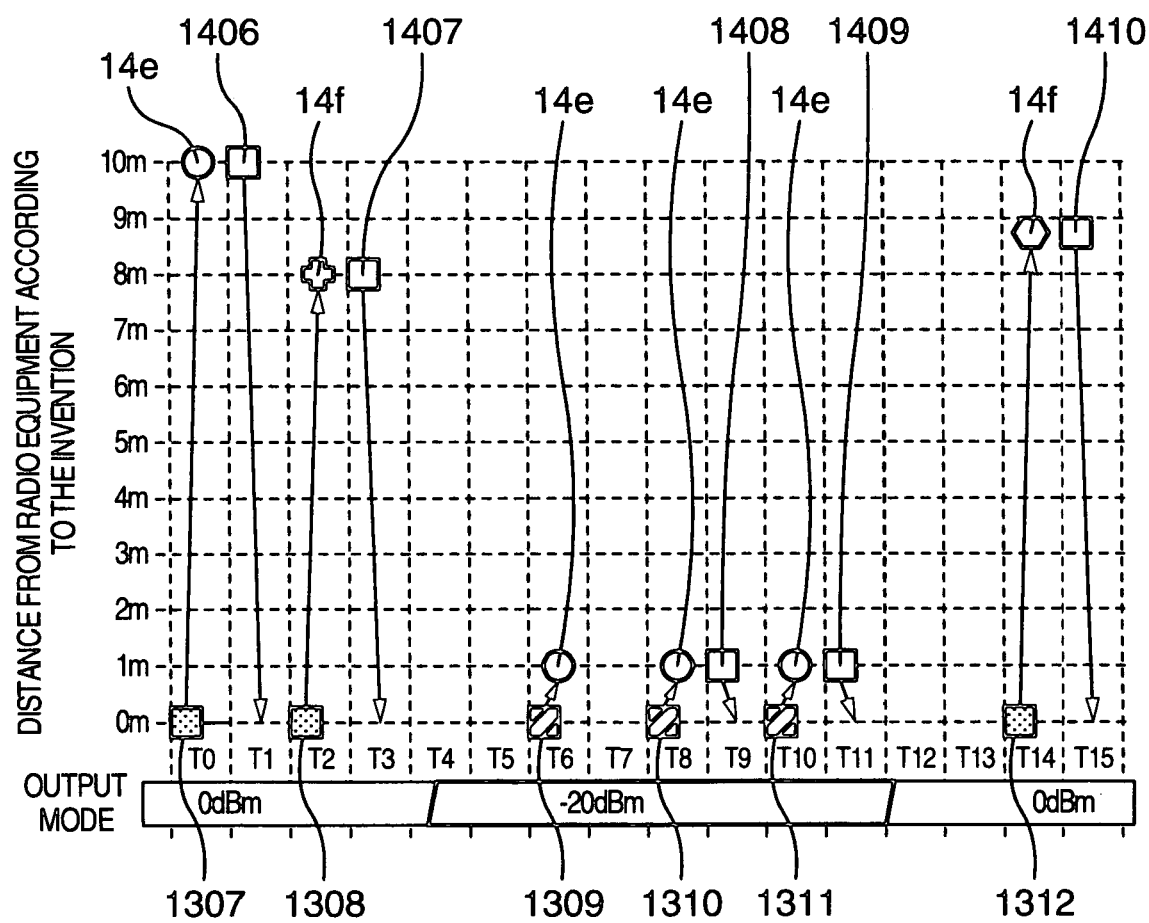
FIG. 7 is a diagram showing changing over the radio coverage range and the input receiver coverage and the outline of communication on the basis of detection means.

FIG. 7 is a diagram showing timing of changing over the radio coverage range and the input receiver coverage and timing of communication in the case where the radio equipment 13 has a radiation sensor as detection means for detecting other radio equipments. In the diagram, the reference numerals 1307, 1308, 1309, 1310, 1311 and 1312 designate calls; 14e and 14f, radio equipments; and 1406, 1407, 1408, 1409 and 1410, replies. The vertical axis shows relative distances of the radio equipment 13 to the radio equipments 14e and 14f.

The radio equipment 13 outputs a call 1307 at time T0 and outputs a call 1308 with power of 0 dBm at time T2. Upon reception of the call 1307, the radio equipment 14e gives a reply 1406 at time T1. Upon reception of the call 1308, the radio equipment 14f gives a reply 1407 at time T3.

After confirming the radio equipment replying in the input receiver coverage with a 10 m radius, the radio equipment 13 changes over its output to −20 dBm. In the diagram, changing-over of the output is completed at time T4. The radio equipment 13 detects approach of the other radio equipment by a radiation sensor included in the host controller 1. Upon detection of approach of the radio equipment 14e by the radiation sensor, the radio equipment 13 outputs a call 1309 at time T6. In the diagram, the radio equipment 14e gives no reply to the radio equipment 13 because the assumption that the call 1309 is not for the radio equipment 14e is made. When there is no reply, the radio equipment 13 recognizes that the called radio equipment is not coming near to the radio equipment 13. Continuously, the radio equipment 13 outputs a call 1310 addressed to the radio equipment 14e at time T8. Upon reception of the call 1310, the radio equipment 14e gives a reply 1408 at time T9.

Upon reception of the reply 1408, the radio equipment 13 recognizes the presence of the radio equipment 14e in the neighbor of the area with a 1 m radius centering about the radio equipment 13, so that the radio equipment 13 can confirm the radio equipment reaching a neighbor of the radio equipment 13.

The radio equipment 13 outputs a call 1311 at time T10 and begins to provide service to the radio equipment 14e, such as sending of an electronic ticket, sending of electronic money, provision of information, and so on. When the radio equipment 14e gives a reply 1409 at time T11, the provision of this service is completed.

Until the provision of service to the radio equipment 14e is completed, the radio equipment 13 does not detect approach of other radio equipments than the radio equipment 14e. Therefore, upon completion of the provision of service to the radio equipment 14e, the radio equipment 13 returns its output to 0 dBm in order to provide service to another radio equipment. In the diagram, changing-over of the output is completed at time T12.

The radio equipment 13 outputs a call 1312 at time T14 to tell the other radio equipment that provision of service to the other radio equipment is enabled. Upon reception of the call 1312, the radio equipment 14f gives a reply 1410 at time T15. The call 1312 is a call for urging the radio equipment 14f to come near to the radio equipment 13.

The radio equipment 13 having succeeded in calling the radio equipment 14f at an output of 0 dBm begins to prepare for provision of service. During this time, the radio equipment 13 continuously calls another radio equipment newly entering the input receiver coverage of the radio equipment 13. When the radiation sensor detects approach of another radio equipment to the neighbor of the radio equipment 13, the radio equipment 13 changes over its output to −20 dBm and specifies the called radio equipment. The radio equipment 13 having succeeded in specifying the radio equipment provides the prepared service. Upon detection of approach of another radio equipment at the time of provision of service, the radio equipment 13 specifies the radio equipment continuously at an output of −20 dBm after the provision of service and provides service.

When approach of another radio equipment is not detected at the time of provision of service, the radio equipment 13 changes over its output mode to 0 dBm again, calls another radio equipment and urges the radio equipment to come near to the radio equipment 13 if necessary. Accordingly, the radio equipment 13 can control approach of a plurality of radio equipments and can provide service to the plurality of radio equipments sequentially.

Figure 8:
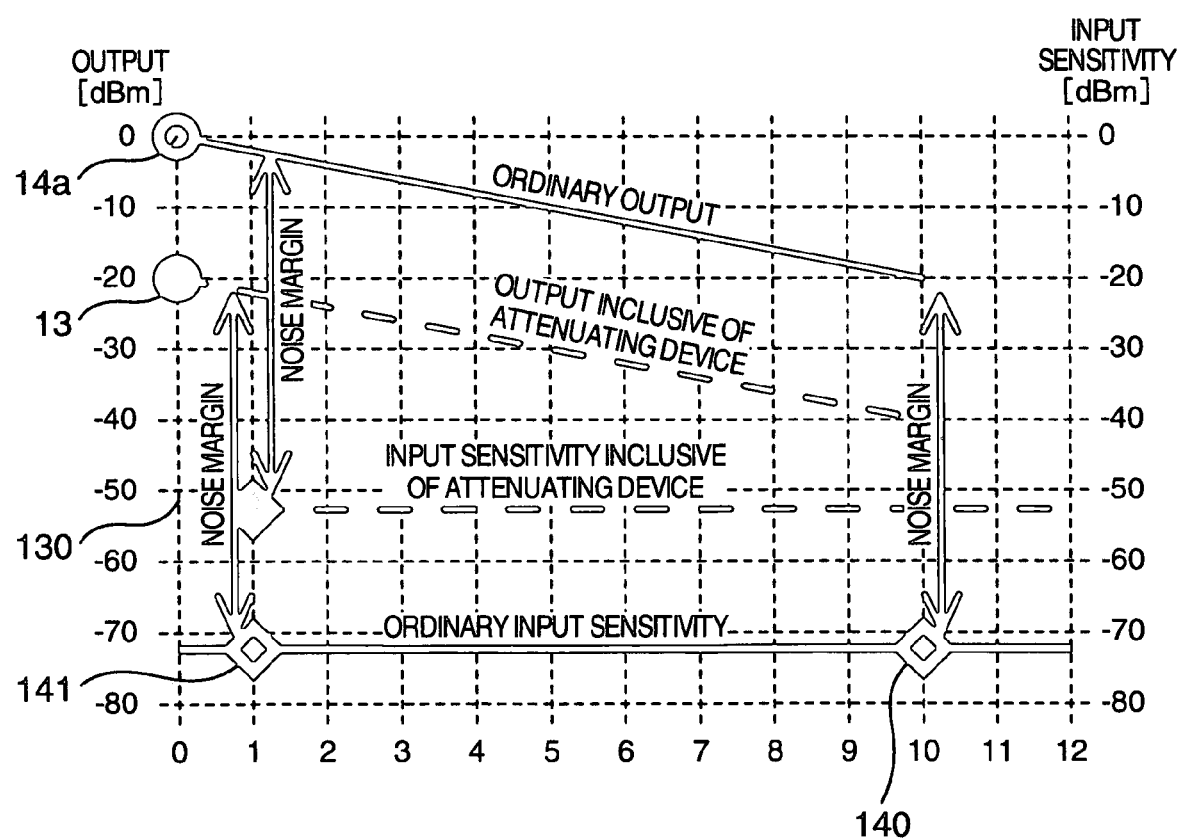
FIG. 8 is a graph showing the relation between output and input sensitivity of the radio equipment according to the invention.

FIG. 8 is a graph showing the relation between output and input sensitivity in the radio equipment 13. In the graph, the reference numeral 130 designates input sensitivity of the radio equipment 13; and 140 and 141, input sensitivities of a conventional radio equipment.

Generally, the input sensitivity of the radio equipment is set in consideration of the noise level in the periphery of the radio equipment. Specifically, a noise margin of 50 dB is taken for a required sensitivity. That is, the input sensitivity of the radio equipment is defined in such a manner that a noise margin of 50 dB is added to electric field intensity in the periphery. The input sensitivity of the conventional radio equipment is −72 dBm.

In the graph, the output of the radio equipment 14a located at a distance of 0 m is received at the input sensitivity 140 tinged with the noise margin of 50 dB by the conventional radio equipment located at a distance of 10 m. That is, the outputs of conventional radio equipments can be received by each other if the conventional radio equipments are at a distance of 10 m from each other.

Next, communication between the conventional radio equipment and the radio equipment 13 will be described. When the output of the conventional radio equipment is to be received by the radio equipment 13, the distance in which the radio equipment 13 with input sensitivity of −52 dBm can keep the noise margin of 50 dB as against the output of the radio equipment 14a located at a distance of 0 m in the graph, that is, the distance in which the radio equipment 13 can receive the output of the radio equipment 14a is 1 m as represented by the position of input sensitivity 130 of the radio equipment 13.

On the other hand, when the output of the radio equipment 13 is to be received by the conventional radio equipment, the output of the radio equipment 13 located at a distance of 0 m in the graph has been already attenuated by 20 dBm by the attenuator. Accordingly, the distance in which the conventional radio equipment with input sensitivity of −72 dBm can keep the noise margin of 50 dB, that is, the distance in which the conventional radio equipment can receive the output of the radio equipment 13 is 1 m as represented by the position of input sensitivity 141 of the conventional radio equipment.

As described above, the radio equipment to which the invention is applied is not only compatible with the conventional radio equipment in terms of connection to the conventional radio equipment at the output through the antenna 91 but also kept compatible with the conventional radio equipment in terms of connection to the conventional radio equipment even at a near distance of 1 m if the antenna 91 is changed over to the antenna 92 with the attenuator 10.

When the antenna 91 and the antenna 92 are dynamically changed over by the switch, the radio coverage range and the input receiver coverage can be dynamically changed over, for example, to 10 m and 1 m.

Figure 9:
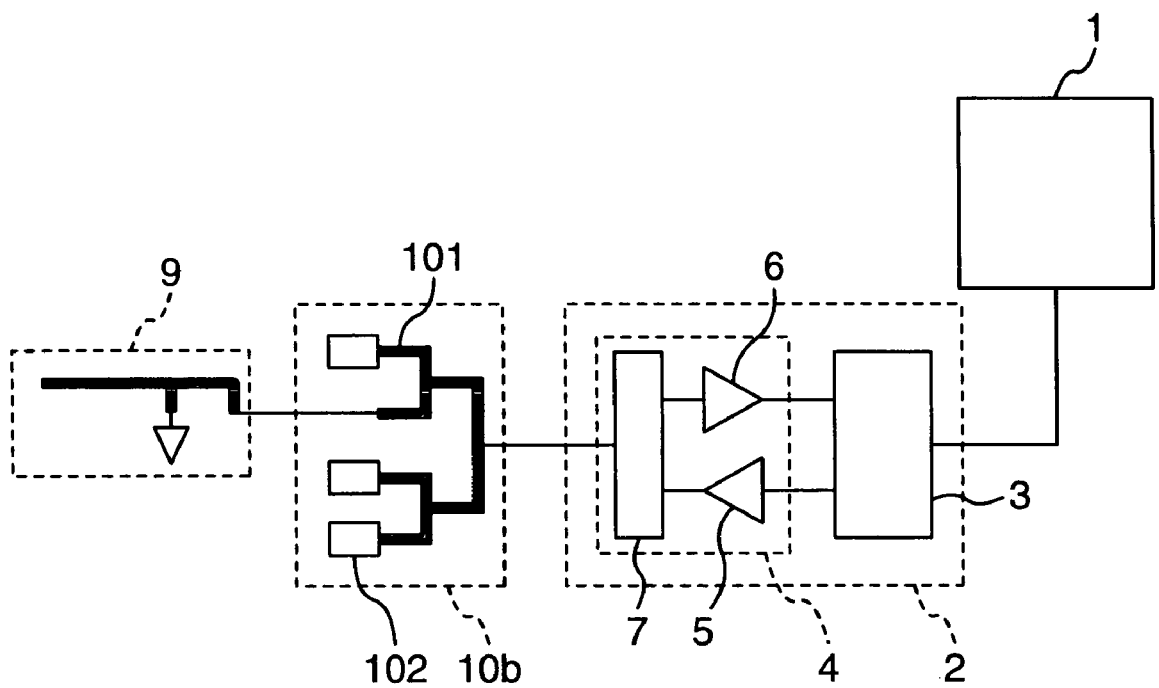
FIG. 9 is a diagram showing a first modified example of the radio equipment to which the invention is applied.

FIG. 9 is a diagram showing a first modified example of the radio equipment to which the invention is applied. In the diagram, the reference numeral 10b designates an attenuator; 101, a splitter; and 102, a balun or terminator. Data output from the radio module 2 is input to the attenuator 10b. Whenever the data input to the attenuator 10b is split into two by the splitter 101 included in the attenuator 10b, the intensity of the data is attenuated to a half. The split data is output from one branch of the splitter 101 to the antenna 9. The data reaching the other branches are terminated by the terminators 102 attached to ends of the branches respectively.

In this modified example, both output and input can be attenuated at the same ratio by the splitter 101. Accordingly, the radio coverage range and the input receiver coverage can be reduced while balance of the two ranges is kept constant.

Figure 10:
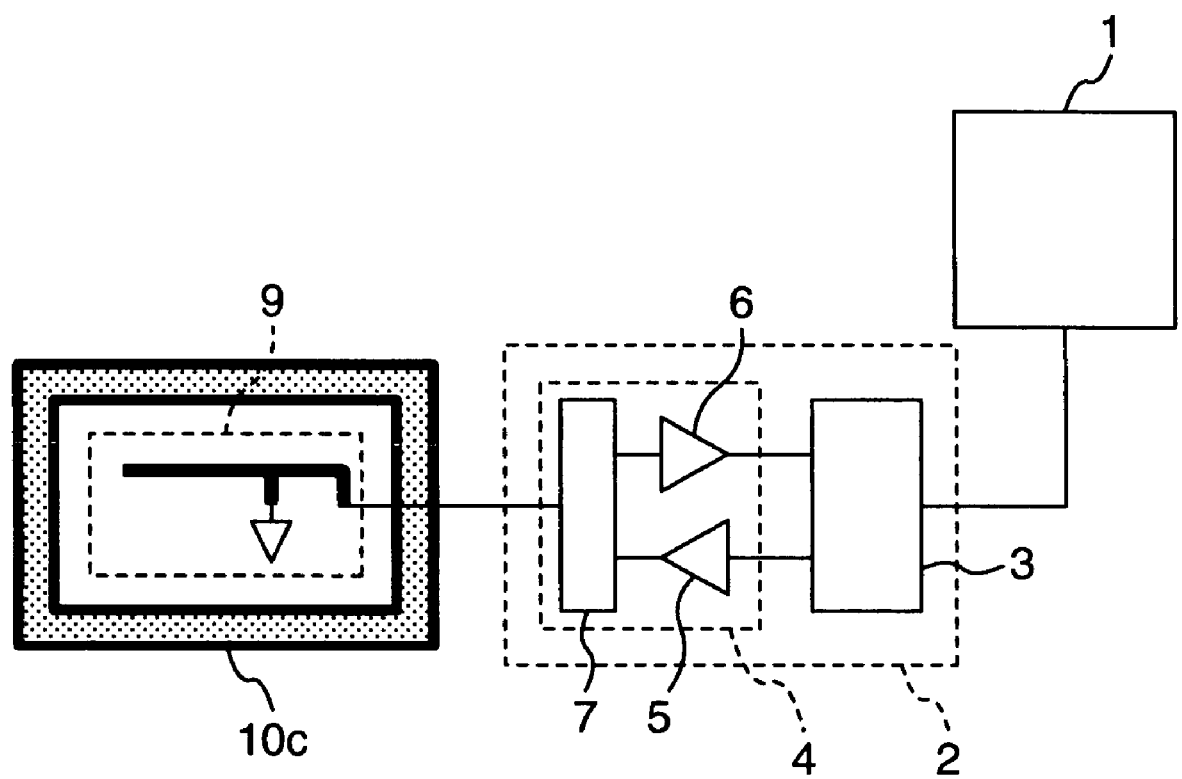
FIG. 10 is a diagram showing a second modified example of the radio equipment to which the invention is applied.

FIG. 10 is a diagram showing a second modified example of the radio equipment to which the invention is applied. In the diagram, the reference numeral 10c designates an attenuating device including metal pieces. In the second modified example, the antenna 9 is wrapped in the attenuating device 10c so that the radio coverage range and the input receiver coverage of the radio equipment can be reduced while balance of the two ranges is kept constant.

Figure 11:
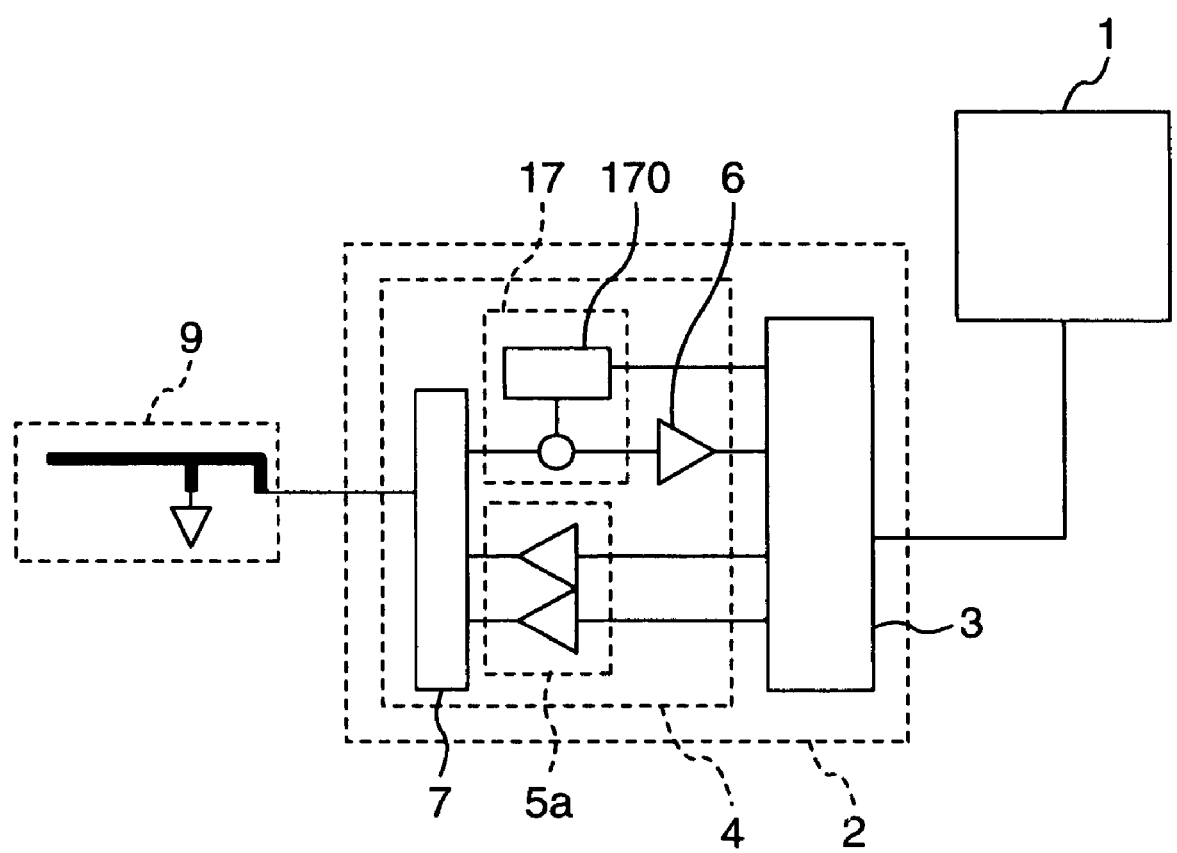
FIG. 11 is a diagram showing a third modified example of the radio equipment to which the invention is applied.
Figure 12:
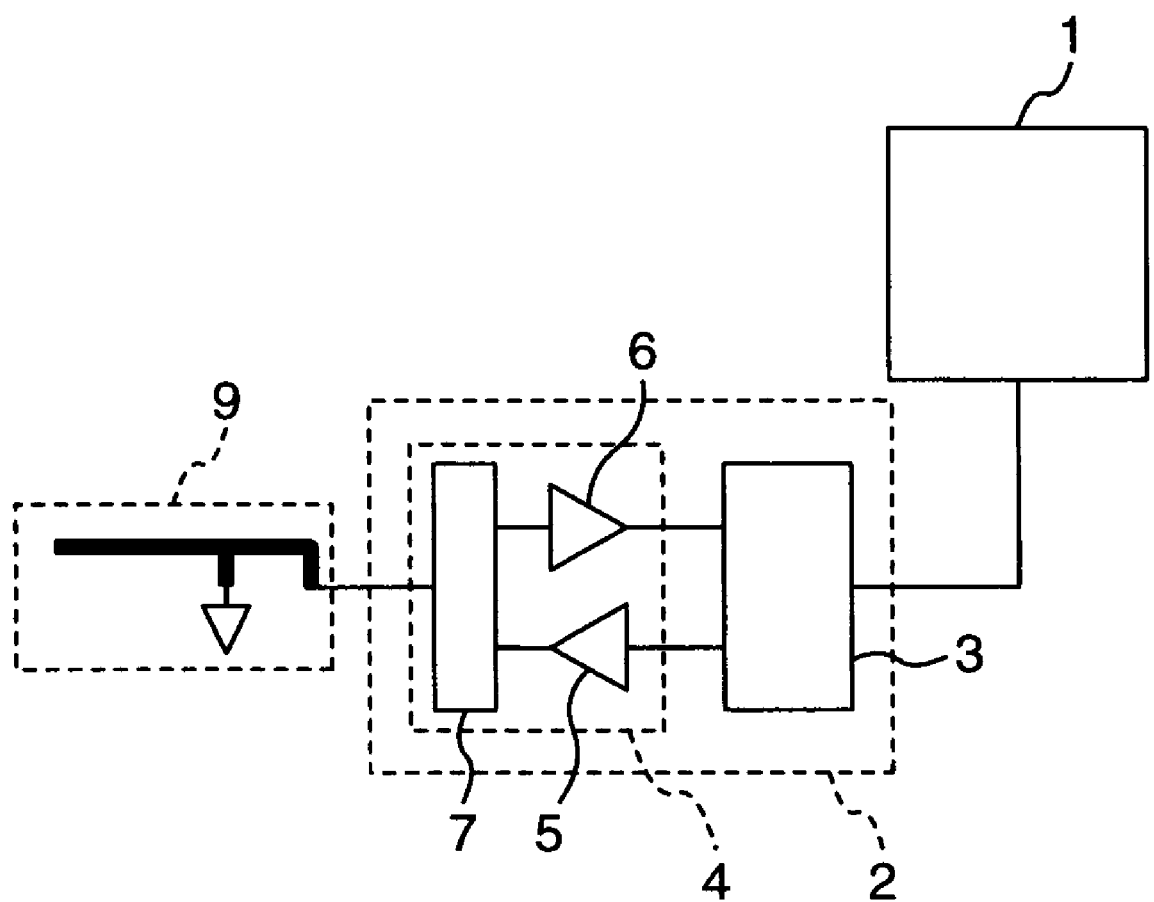
FIG. 12 is a diagram showing a conventional technique.

FIG. 11 is a diagram showing a third modified example of the radio equipment to which the invention is applied. In the diagram, the reference numeral 5a designates a variable output power amplifier; and 17, a mixer circuit. The mixer circuit 17 has a noise source 170.

The final stage of the variable output power amplifier 5a has a plurality of power amplifiers. Accordingly, the output of the variable output power amplifier 5a varies in accordance with the number of power amplifiers switched on. The plurality of power amplifiers may be all equal in transistor size and area or may be different from one another in transistor size and area. Incidentally, the output of the variable output power amplifier 5a increases in proportion to the area of transistors of power amplifiers switched on. Accordingly, it is necessary to incorporate the plurality of power amplifiers in the variable output power amplifier 5a so that a required output can be obtained in the variable output power amplifier 5a. The base band controller 3 controls the number of power amplifiers switched on in the variable output power amplifier 5a. When, for example, all the plurality of power amplifiers are switched on, a coverage range with a 10 m radius is achieved by the variable output power amplifier 5a. When, for example, only one power amplifier is switched on, a coverage range with a 1 m radius is achieved by the variable output power amplifier 5a.

Data received in the antenna 9 is input to the mixer circuit 17. The mixer circuit 17 mixes the input data with noise generated in the noise source 170 and outputs the mixture to the low-noise input amplifier 6. Because noise is mixed, the input sensitivity of the low-noise input amplifier 6 is reduced from −70 dBm to −50 dBm. The base band controller 3 suppresses the output of noise by directly controlling the noise source 170.

According to this modified example, the radio coverage range and the input receiver coverage can be reduced while balance of the two ranges is kept constant by the radio interface 4 having the variable output power amplifier 5a and the mixer circuit 17. Furthermore, the base band controller 3 can control the radio coverage range by controlling the variable output power amplifier 5a. In addition, the base band controller 3 can adjust the input receiver coverage finely by controlling the noise source 170.

FIG. 13 is a diagram showing a fourth modified example of the radio equipment to which the invention is applied. In the diagram, the reference numeral 18 designates a printed circuit board; 181, a plate metal conductor which is a ground layer in inner layers of the printed circuit board 18; 182, a plate metal conductor which is an electric power supply layer in inner layers of the printed circuit board 18; and 93 and 94, antennas.

In the diagram, the radio module 2, the switch 8 and the antennas 93 and 94 are mounted on a surface of the printed circuit board 18.

The plate metal conductor 181 as a ground layer and the plate metal conductor 182 as an electric power supply layer are disposed as inner layers of the printed circuit board 18 successively viewed from the side near the radio module 2. The plate metal conductors 181 and 182 supply electric power to the radio module 2 and the switch 8.

The antenna 93 is disposed so as to overlap the plate metal conductors 181 and 182 viewed from above the printed circuit board 18. When viewed from above the printed circuit board 18, the antenna 93 has no portion not overlapping the plate metal conductors 181 and 182.

The gap between the antenna 93 and nearer one of the plate metal conductors 181 and 182 to the antenna 93 is in a range of from 0.1 mm to 2 mm. This gap comes from the thickness of an electrically insulating film inserted between the metal conductors. Sufficient insulation withstand voltage and parasitic capacitance can be achieved by this thickness. In this modified example, the printed circuit board 18 is produced in such a manner that electrically insulating films and metal conductors are piled up alternately like a sandwich. The thickness of the printed circuit board 18 is limited to about 2 mm by a board-producing apparatus. If the gap is secured, sufficient insulation withstand voltage and parasitic capacitance, however, can be achieved even in the case where the printed circuit board 18 is about 2 mm thick. Even in a so-called build-up board formed in such a manner that metal conductors and insulators are laminated on an electrically insulating film as a substrate, the same performance as described above can be achieved if the aforementioned gap is selected to be in a range of from 0.1 mm to 2 mm.

On the other hand, the antenna 94 is disposed so as not to overlap the plate metal conductors 181 and 182 viewed from above the printed circuit board 18. When viewed from above the printed circuit board 18, the antenna 94 has no portion overlapping the plate metal conductors 181 and 182.

Data output from the radio module 2 is input to the antenna 93 or 94 through the switch 8. The switch 8 changes over a circuit so as to be electrically connected to either the antenna 93 or the antenna 94.

Capacitance is parasitic between the antenna 93 and the plate metal conductors 181 and 182, so that the resonance frequency of the antenna 93 is reduced. Accordingly, SWR becomes high, so that the rate of radiation of electric power from the antenna 93 to space is reduced.

Further, a large part of magnetic flux component of radio wave radiated from the antenna 93 is absorbed to the plate metal conductors 181 and 182. Accordingly, when radio wave is radiated from the antenna 93, electric field intensity in a neighbor of the radio equipment becomes weak compared with the case where radio wave is radiated from the antenna 94.

That is, electric power radiated from the antenna 93 to space is lower than electric power radiated from the antenna 94 to space because of generation of parasitic capacitance and absorption of magnetic flux. The antenna gain at the time of input to the antenna 93 is lower than that at the time of input to the antenna 94.

Accordingly, in this modified example, when the antenna 93 and the antenna 94 are changed over by the switch 8, the radio coverage range and the input receiver coverage can be dynamically changed over, for example, to 10 m and 1 m.

Figure 14:
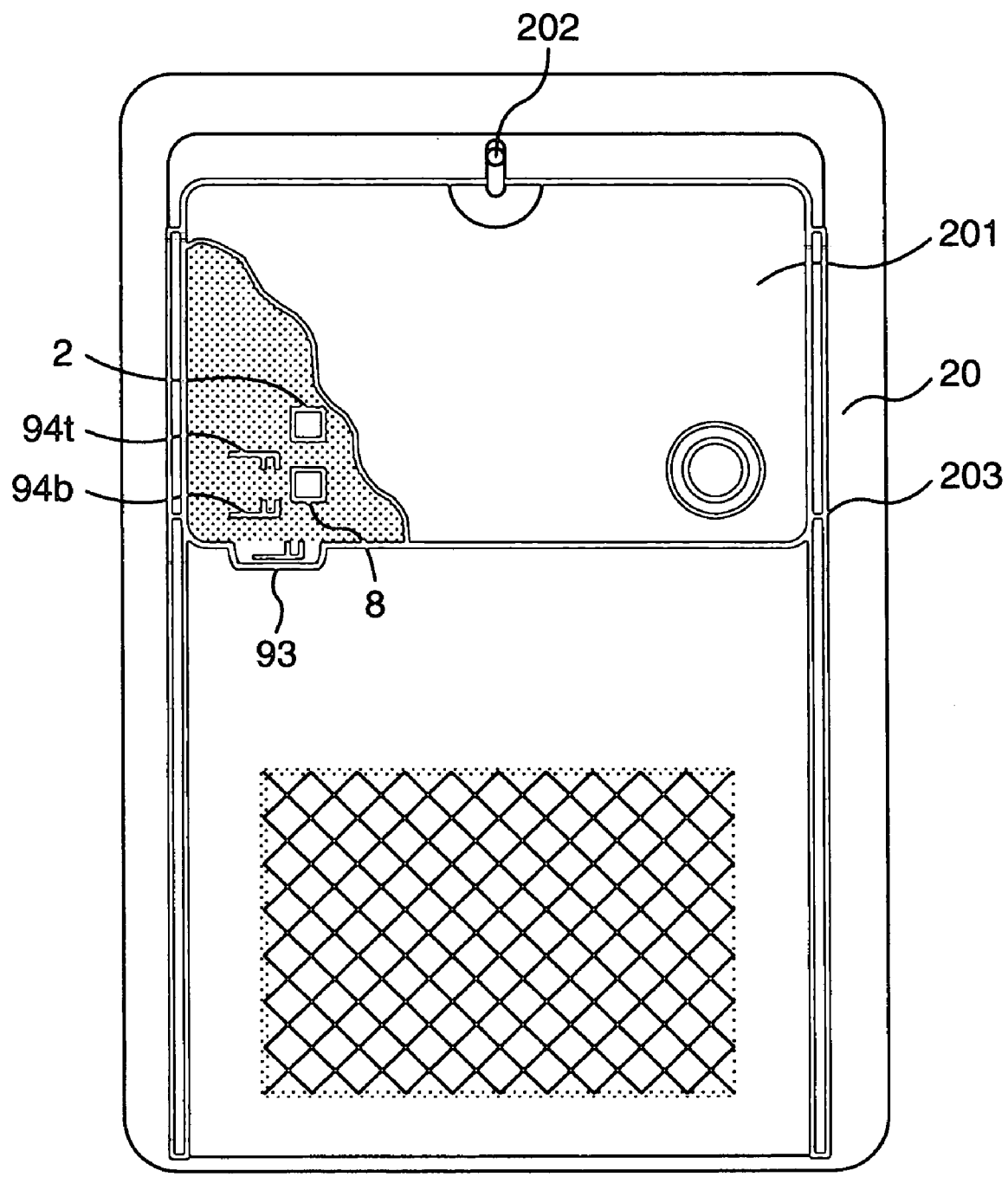
FIG. 14 is a diagram showing a method for mounting the invention in a tray of a seat.

FIG. 14 is a diagram showing a state in which the radio equipment to which the invention is applied is mounted in a back rest of a seat in an electric car, an airplane, or the like. In the diagram, the reference numeral 20 designates a rear surface of the back rest; 201, a tray mounted in the rear surface of the back rest; 202, a latch for fixing the tray; 203, a beam and hinge of the tray; 94t, a tray built-in antenna on the tray upper surface side; and 94b, a tray built-in antenna on the tray floor surface side. This diagram shows a state in which the tray 201 is fixed to the rear surface 20 of the back rest of a front seat by the latch 202.

The tray 201 includes the radio module 2, the switch 8, the antenna 93, the tray upper surface side tray built-in antenna 94t, and the tray floor surface side tray built-in antenna 94b.

The tray upper surface side tray built-in antenna 94t and the tray floor surface side tray built-in antenna 94b are attenuating function-including antennas. The tray upper surface side tray built-in antenna 94t has a radiation pattern covering a neighbor of the upper surface of the tray. The tray floor surface side tray built-in antenna 94b has a radiation pattern covering a neighbor of the floor surface side of the tray. The antenna 93 has a radiation pattern widely covering both the upper surface side and the floor surface side of the tray.

The radio module 2 uses the antenna 93 when it starts. Then, the radio module 2 changes over the used antenna to the tray floor surface side tray built-in antenna 94b or the tray upper surface side tray built-in antenna 94t by using the switch 8 when the radio module 2 begins to provide service to the user. When the antenna is changed over to these antennas, the radio equipment built in the tray can communicate with a neighbor of the tray, specifically only a neighbor of a seated person using the tray. As a result, only the radio equipment used by the user in the seat can communicate with the radio equipment built in the tray.

The radio module 2 detects the position of the tray 201 by detecting the fact that the latch 202 is located in a latch position or the fact that the beam and hinge 203 of the tray 201 is not located in a bending position. The radio module 2 selects and uses the tray floor surface side tray built-in antenna 94b at the time of storage of the tray 210 and the tray upper surface side tray built-in antenna 94t at the time of extraction of the tray 201 on the basis of the detected information.

FIG. 15 is a diagram showing a fifth modified example of the radio equipment to which the invention is applied. In the diagram, the reference numeral 183 designates a plate metal conductor in inner layers of the printed circuit board 18; 19, a switch; and 95, an antenna. Incidentally, the switch 19 may be replaced by a relay circuit.

The radio module 2 and the antenna 95 are mounted on a front surface of the printed circuit board 18. The switch 19 is mounted on a rear surface of the printed circuit board 18.

The plate metal conductor 181 and the plate metal conductor 182 are disposed as inner layers of the printed circuit board successively viewed from the side near the radio module 2. The plate metal conductors 181 and 182 supply electric power to the radio module 2 and the switch 19.

The antenna 95 is disposed so as to overlap the plate metal conductor 183 viewed from above the printed circuit board 18. When viewed from above the printed circuit board 18, the antenna 94 has no portion not overlapping the plate metal conductor 183.

The gap between the antenna 93 and the plate metal conductor 183 is in a range of from 0.1 mm to 2 mm.

Data output from the radio module 2 is input to the antenna 95. The switch 19 controls electrical connection between the plate metal conductor 181 as a ground layer and the plate metal conductor 183 by turning on and off.

When the plate metal conductor 181 as a ground layer is electrically connected to the plate metal conductor 183 by the switch 19, capacitance is parasitic between the antenna 95 and the plate metal conductor 183. Accordingly, the resonance frequency of the antenna 95 is reduced, so that SWR becomes high. Accordingly, the rate of radiation of electric power from the antenna 95 to space is reduced.

Further, in this case, a large part of magnetic flux component of radio wave radiated from the antenna 95 is absorbed to the plate metal conductor 183. Accordingly, electric field intensity in a neighbor of the radio equipment is reduced by about 50 dB in a 2.4 GHz band, that is, weakened to about ½50 compared with the case where there is no electrical connection to the plate metal conductor 183.

Accordingly, when the switch 19 electrically connects the plate metal conductor 181 as a ground layer to the plate metal conductor 183, electric power radiated from the antenna 95 to space is reduced and the antenna gain at the time of input is reduced because of parasitic capacitance and absorption of magnetic flux.

Conversely, when the plate metal conductor 181 as a ground layer is disconnected from the plate metal conductor 183 by the switch 19, the effect of parasitic capacitance and absorption of magnetic flux does not occur. Accordingly, electric power radiated from the antenna 95 to space is unchanged.

That is, in this modified example, when the switch 19 is turned on and off, the radio coverage range and the input receiver coverage of the radio equipment can be dynamically changed over, for example, to 10 m and 1 m.

Although this modified example has been described on the assumption that an MOS transistor switch or an electromagnetic relay is used as the switch 19, a switching regulator having its operation switched on and off from the outside may be used as the switch 19.

The radio equipment to which the invention is applied can roughly classify other radio equipments in a radio network into radio equipments out of the input receiver coverage and radio equipments within the input receiver coverage by controlling and reducing the input receiver coverage of the equipment itself. The radio equipment to which the invention is applied behaves as a hidden terminal to the radio equipments out of the input receiver coverage. Because the radio equipment behaves as a hidden terminal, the radio equipment does not reply to the radio equipments out of the input receiver coverage at all and there is no call reaching the radio equipments out of the input receiver coverage. In this manner, the radio equipment to which the invention is applied can divide the radio network dynamically for convenience' sake.

Furthermore, when the input receiver coverage is reduced, linkage between some radio equipment changed from within the input receiver coverage to out of the input receiver coverage and the radio equipment to which the invention is applied is ceased. Accordingly, the radio equipment to which the invention is applied can be used for constructing a radio network so that linkages between the radio equipment and a plurality of radio equipments can be ceased at once intentionally.

INDUSTRIAL APPLICABILITY

As described above, the invention is useful in dynamically changing the radio coverage range and the input receiver coverage in the radio equipment. The invention is also useful in confirming relative distances between radio equipments. The invention is further useful in exchanging service efficiently in a radio network.

What is claimed:

1. A radio equipment comprising:
   a host controller;
   a radio module connected to said host controller;
   a first antenna;
   a second antenna to which an attenuator is connected; and
   a switch connected to said host controller so as to change over said first antenna and said second antenna;
   wherein said host controller controls said switch to select either said first antenna or said second antenna, so that when said second antenna is selected, the intensity of a signal input from said second antenna to said radio module and the intensity of a signal output from said radio module to said second antenna are relationally controlled, and wherein said host controller controls said attenuator to control input receiver coverage of said second antenna to be narrower than input receiver coverage of said first antenna, and
   wherein when said radio equipment transitions from a communication-disabled state to a communication-enabled state, the antenna with attenuator is changed to retrieve the quantity of attenuation of said attenuator forbidding said radio equipment from receiving a radio wave transmitted from a far specific radio equipment out of ambient radio equipments and set said attenuator to the retrieved quantity of attenuation to thereby make said radio equipment transition to a state forbidding said radio equipment from receiving the radio wave transmitted from said far specific radio equipment.

2. A radio system including a far specific radio equipment, said for specific radio equipment comprising the radio equipment according to claim 1, characterized in that when a radio wave transmitted from a radio equipment transitioning to a state forbidding a radio wave transmitted from said far specific radio equipment is received by said far specific radio equipment, said far specific radio equipment retrieves the quantity of attenuation of said attenuator forbidding said far specific radio equipment from receiving a radio wave transmitted from said radio equipment and sets its own attenuator to the retrieved quantity of attenuation to thereby make said far specific radio equipment transition to a state forbidding said far specific radio equipment from receiving the radio wave transmitted from said radio equipment.

3. A radio equipment according to claim 1, characterized in that said radio equipment transitioning to a state forbidding said radio equipment from receiving a radio wave transmitted from a far specific radio equipment reduces the quantity of attenuation of said attenuator and transmits a radio wave when the quantity of attenuation reaches the maximum value of the attenuating device or exceeds a reference value set in advance or when a predetermined time has passed after the quantity of attenuation of said attenuator is set.

4. A radio equipment according to claim 3, wherein a radio wave transmitted from a radio equipment is information (beacon) concerning said radio equipment.

5. A radio equipment according to claim 1, characterized in that said attenuating device comprises a plurality of final output amplifier portions and that said radio equipment transitioning to a state forbidding said radio equipment from receiving a radio wave transmitted from a far specific radio equipment increases the number of operated output amplifier portions in the plurality of final output amplifier portions to increase its output when the quantity of attenuation reaches the maximum value of the attenuating device or exceeds a reference value set in advance or when a predetermined time has passed after the quantity of attenuation of said attenuator is set.

6. A radio equipment according to claim 5, wherein a radio wave transmitted from a radio equipment is information (beacon) concerning said radio equipment.

7. A radio equipment according to claim 1, wherein a radio wave transmitted from a specific radio equipment is base station information (beacon).

8. A radio equipment according to claim 1, characterized in that said radio equipment transitioning to a state forbidding said radio equipment from receiving a radio wave transmitted from a far specific radio equipment reduces the quantity of attenuation of said attenuator when there is no reply from an ambient radio equipment being in communication with said radio equipment or when error occurs frequently, and keeps the quantity of attenuation of said attenuator to the reduced value until said radio equipment cuts off communication on the basis of a cut-off request issued from said ambient radio equipment or on the basis of its own decision.

9. A radio equipment according to claim 1, characterized in that said radio equipment transitioning to a state forbidding said radio equipment from receiving a radio wave transmitted from a far specific radio equipment reduces the quantity of attenuation until some ambient radio equipment is found if there is no ambient radio equipment found, and returns the quantity of attenuation to its original value even at an output with the quantity of attenuation of zero.

10. A radio equipment according to claim 1, characterized in that said radio equipment has attenuating means for attenuating input/output of radio wave to a level forbidding said radio equipment from receiving a beacon transmitted from an ambient base station using a common channel when said radio equipment is in operation.

11. A radio equipment according to claim 10, characterized in that said attenuating means included in said radio equipment for attenuating input/output of radio wave is added to an antenna so as to be dynamically variable.

12. An attenuating means included in a radio equipment according to claim 10 for attenuating input/output of radio wave, characterized in that gain setting in an output stage in which an output is dynamically variable is interlocked with gain setting in an input stage in which an input is dynamically variable.

13. A radio equipment according to claim 10, characterized in that said radio equipment reduces the quantity of attenuation and transmits a beacon occasionally to thereby notify said ambient base station using said common channel of the radio equipment's being in operation.

14. A radio network comprising:
    a radio equipment including:
        a host controller,
        a radio module connected to said host controller,
        a first antenna,
        a second antenna to which an attenuator is connected, and
        a switch connected to said host controller so as to change over said first antenna and said second antenna, wherein said host controller controls said switch to select either said first antenna or said second antenna, so that when said second antenna is selected, the intensity of a signal input from said second antenna to said radio module and the intensity of a signal output from said radio module to said second antenna are relationally controlled, and wherein said host controller controls said attenuator to control input receiver coverage of said second antenna to be narrower than input receiver coverage of said first antenna; and a group of other radio equipment;

wherein said radio equipment uses said switch to change over use of said first antenna and use of said second antenna so that said radio equipment behaves as a hidden terminal to any radio equipment that belongs to said group of other radio equipments and that is located at a predetermined distance from said radio equipment; and wherein when said radio equipment transitions from a communication-disabled state to a communication-enabled state, the antenna with attenuator is changed to retrieve the quantity of attenuation of said attenuator forbidding said radio equipment from receiving a radio wave transmitted from a far specific radio equipment out of ambient radio equipments and set said attenuator to the retrieved quantity of attenuation to thereby make said radio equipment transition to a state forbidding said radio equipment from receiving the radio wave transmitted from said far specific radio equipment.

15. A radio network according to claim 14, characterized in that said radio equipment transitioning to a state forbidding said radio equipment from receiving a radio wave transmitted from a far specific radio equipment reduces the quantity of attenuation of said attenuator and transmits a radio wave when the quantity of attenuation reaches the maximum value of the attenuating device or exceeds a reference value set in advance or when a predetermined time has passed after the quantity of attenuation of said attenuator is set.

16. A radio network according to claim 14, characterized in that said attenuating device comprises a plurality of final output amplifier portions and that said radio equipment transitioning to a state forbidding said radio equipment from receiving a radio wave transmitted from a far specific radio equipment increases the number of operated output amplifier portions in the plurality of final output amplifier portions to increase its output when the quantity of attenuation reaches the maximum value of the attenuating device or exceeds a reference value set in advance or when a predetermined time has passed after the quantity of attenuation of said attenuator is set.

17. A radio network according to claim 14, characterized in that said radio equipment transitioning to a state forbidding said radio equipment from receiving a radio wave transmitted from a far specific radio equipment reduces the quantity of attenuation of said attenuator when there is no reply from an ambient radio being in communication with said radio equipment or when error occurs frequently, and keeps the quantity of attenuation said attenuator to the reduced value until said equipment cuts off communication on the basis of a cut-off request issued from said ambient radio equipment or on the basis of its own decision.

18. A radio network according to claim 14, characterized in that said radio equipment transitioning to a state forbidding said radio equipment from receiving a radio wave transmitted from a far specific radio equipment reduces the quantity of attenuation until some ambient radio equipment is found if there is no ambient radio equipment found, and returns the quantity of attenuation to its original value even at an output with the quantity of attenuation zero.

19. A radio equipment comprising:
a host controller;
a radio module connected to said host controller;
a first antenna;
a second antenna to which an attenuating device is connected; and
a switch connected to said host controller so as to change over said first antenna and said second antenna;
wherein said host controller controls said switch to select either said first antenna or said second antenna, so that when said second antenna is selected, the intensity of a signal input from said second antenna to said module and the intensity of a signal output from said radio module to said second antenna are relationally controlled, and wherein said host controller controls said attenuating device to control input receiver coverage of said second antenna to be narrower than input receiver coverage of said first antenna, and
wherein said host controller switches, during time of communicating with another radio equipment through said first antenna, from said first antenna to said second antenna after a predetermined time according to timer to determine whether said radio equipment is in said state of receiving no reply transmitted from said other radio equipment thereby to determine a distance between said radio equipment and said other radio equipment.

20. A radio equipment comprising:
a host controller;
a radio module connected to said host controller;
a first antenna;
a second antenna to which an attenuating device is connected; and
a switch connected to said host controller so as to change over said first antenna and said second antenna;
wherein;
said host controller controls said switch to thereby selected either said first antenna or said second antenna, so that when said second antenna is selected, the intensity of a signal input from said second antenna to said radio module and the intensity of a signal output from said radio module to said second antenna are relationally controlled,
said host controller controls said attenuating device to control input receiver coverage of second antenna to be narrower than input receiver coverage of said first antenna,
said host controller continues to select said antenna to continue to communicate with other radio equipment when said radio equipment is in a stat receiving reply transmitted from said equipment is in a state receiving reply transmitted from said another radio equipment, and
said host controller determines whether said radio equipment is in said state of receiving no reply transmitted from said far specific radio equipment when said radio equipment is not in a state receiving reply transmitted from said far specific radio equipment.

21. A radio equipment comprising:
a host controller;
a radio module connected to said host controller;
a first antenna;

a second antenna to which an attenuating device is connected; and a switch connected to said host controller so as to change over said first antenna and said second antenna;

wherein:

said host controller controls said switch to there select either said first antenna or said second antenna, so that when second antenna is selected, the intensity of a signal input from said second antenna to said radio module and the intensity of a signal output from said radio module to said second antenna are relationally controlled, said host controller controls said attenuating device to control input receiver coverage of said second antenna to be narrow than input receiver coverage of said first antenna, said host controller continues to select said second antenna to continue to communicate with other radio equipment when said radio equipment is in a state receiving reply transmitted from said equipment is in a state receiving reply transmitted from said another radio equipment, and said host controller continues to select said first antenna until preparation of service is completed when said radio equipment is in a state of receiving reply transmitted through said antenna from said far specific radio equipment, and switches to said second antenna when said preparation service is completed.

* * * * *